(12) United States Patent
Mikes et al.

(10) Patent No.: US 6,522,404 B2
(45) Date of Patent: Feb. 18, 2003

(54) GRATING BASED COMMUNICATION SWITCHING

(75) Inventors: Thomas L Mikes, Ashby, MA (US); Lian-Qin Xiang, Acton, MA (US)

(73) Assignee: Agilent Technologies, Inc., Palo Alto, CA (US)

( * ) Notice: Subject to any disclaimer, the term of this patent is extended or adjusted under 35 U.S.C. 154(b) by 49 days.

(21) Appl. No.: 09/738,863

(22) Filed: Dec. 15, 2000

(65) Prior Publication Data

US 2002/0030814 A1 Mar. 14, 2002

Related U.S. Application Data

(60) Provisional application No. 60/170,801, filed on Dec. 15, 1999, and provisional application No. 60/083,471, filed on Apr. 29, 1998.

(51) Int. Cl.[7] .................................................. G01J 3/28
(52) U.S. Cl. ....................................... 356/328; 356/305
(58) Field of Search ................................ 356/328, 305, 356/326, 334, 419, 330, 456; 359/124, 130; 250/236, 339.02, 334; 385/17, 18

(56) References Cited

U.S. PATENT DOCUMENTS

| | | | | |
|---|---|---|---|---|
| 5,149,959 A | * | 9/1992 | Collins et al. | 250/226 |
| 5,223,910 A | * | 6/1993 | Simeoni et al. | 356/456 |
| 5,267,188 A | * | 11/1993 | Pape et al. | 708/821 |
| 5,371,358 A | * | 12/1994 | Chang et al. | 250/226 |
| 5,394,237 A | * | 2/1995 | Chang et al. | 250/339.02 |
| 5,760,899 A | * | 6/1998 | Eismann | 250/226 |
| 6,049,052 A | * | 4/2000 | Chutjian et al. | 219/69.12 |
| 6,097,859 A | * | 8/2000 | Solgaard et al. | 385/17 |
| 6,157,029 A | * | 12/2000 | Chutjian et al. | 250/292 |
| 6,181,418 B1 | * | 1/2001 | Palumbo et al. | 356/305 |
| 6,191,860 B1 | * | 2/2001 | Klinger et al. | 356/330 |
| 6,266,140 B1 | * | 7/2001 | Xiang et al. | 356/305 |
| 2001/0009596 A1 | * | 7/2001 | Solgaard et al. | 385/18 |
| 2002/0009596 A1 | * | 1/2002 | Mikes et al. | 356/328 |
| 2002/0132489 A1 | * | 1/2002 | Solgaard et al. | 385/18 |

* cited by examiner

Primary Examiner—Thien M. Le

(57) ABSTRACT

An optical communication channel switch includes an aberration corrected spectrometer adapted for receiving plural channels of communication in a one dimensional array of sites where each site corresponds to a source, and a channel selector for selectively switching channels. After receiving the plural channels, the aberration corrected spectrometer provides the channels in a two dimensional array in which channels are distributed in rows (or columns) of similar frequency and different sources and in columns (or rows) of differing frequency and common sources. The channel selector selectively switches channels among sites in the two dimensional array and provides a single dimensional reconfigured array of frequency separated channels that is combined into the two dimensional array. Another aberration corrected spectrometer receives the selectively switched two dimensional array and combines the channels into a single dimensional array of sites having one or more frequency separated channels.

21 Claims, 8 Drawing Sheets

GRATING BASED COMMUNICATION SWITCHING

CROSS REFERENCE TO RELATED APPLICATIONS

This application claims priority under 35 U.S.C. §119(e) to U.S. Provisional Patent Application Ser. No. 60/170,801 filed Dec. 15, 1999; the disclosure of which is incorporated herein by reference. This claims priority under 35 U.S.C. §120, application Ser. No. 09/674,217 filed Oct. 27, 2000 now U.S. Pat. No. 6,266,140, which is U.S. National Phase of PCT/US99/09270 filed Apr. 29, 1999, which claims priority to U.S. Provisional Application No. 60/083,471 filed Apr. 29, 1998

STATEMENT REGARDING FEDERALLY SPONSORED RESEARCH OR DEVELOPMENT

Not Applicable

BACKGROUND OF THE INVENTION

Spectrometers are known and used to provide a spectral image of a scene. FIG. 8 illustrates an example of a known spectrometer 800. In this spectrometer 800, light from an image 810 passes through a slit 820 and a first concave mirror 830 of a reflective assembly 835 receives an image 812. The first mirror 830 is in a light path from the slit 820 and reflects light to a convex diffraction grating 860. The convex diffraction grating 860 receives the reflected light from the first mirror 830. The diffraction grating 860 spectrally disperses the image received from the first mirror 830 into a spectral image 814. A second concave mirror 840 of the reflective assembly 835 receives the spectral image 814 from the diffraction grating 860 and reflects the spectral image 814 to a detector 850, such as a CCD array of a camera or other device.

Preferably, the diffraction grating 860 is a known aberration corrected convex diffraction grating, which provides for simultaneous high spatial and spectral imaging resolution and low distortion. By using the aberration corrected convex diffraction grating, the spectrometer 800 provides a high resolution that may function for a wide variety of applications such as optical communication channel switching.

BRIEF SUMMARY OF THE INVENTION

An optical communication channel switch includes an aberration corrected spectrometer adapted for receiving plural channels of communication in a one dimensional array of sites where each site corresponds to a source, and a channel selector for selectively switching channels. After receiving the plural channels, the aberration corrected spectrometer provides the channels in a two dimensional array in which channels are distributed in rows (or columns) of similar frequency and different sources and in columns (or rows) of differing frequency and common sources. The channel selector selectively switches channels among sites in the two dimensional array and provides a single dimensional reconfigured array of frequency separated channels that is combined into the two dimensional array. Another aberration corrected spectrometer receives the selectively switched two dimensional array and combines the channels into a single dimensional array of sites having one or more frequency separated channels.

BRIEF DESCRIPTION OF THE SEVERAL VIEWS OF THE DRAWING

The invention will be more fully understood from the following detailed description taken in conjunction with the accompanying drawings in which.

DETAIL DESCRIPTION OF THE INVENTION

Figure 1:
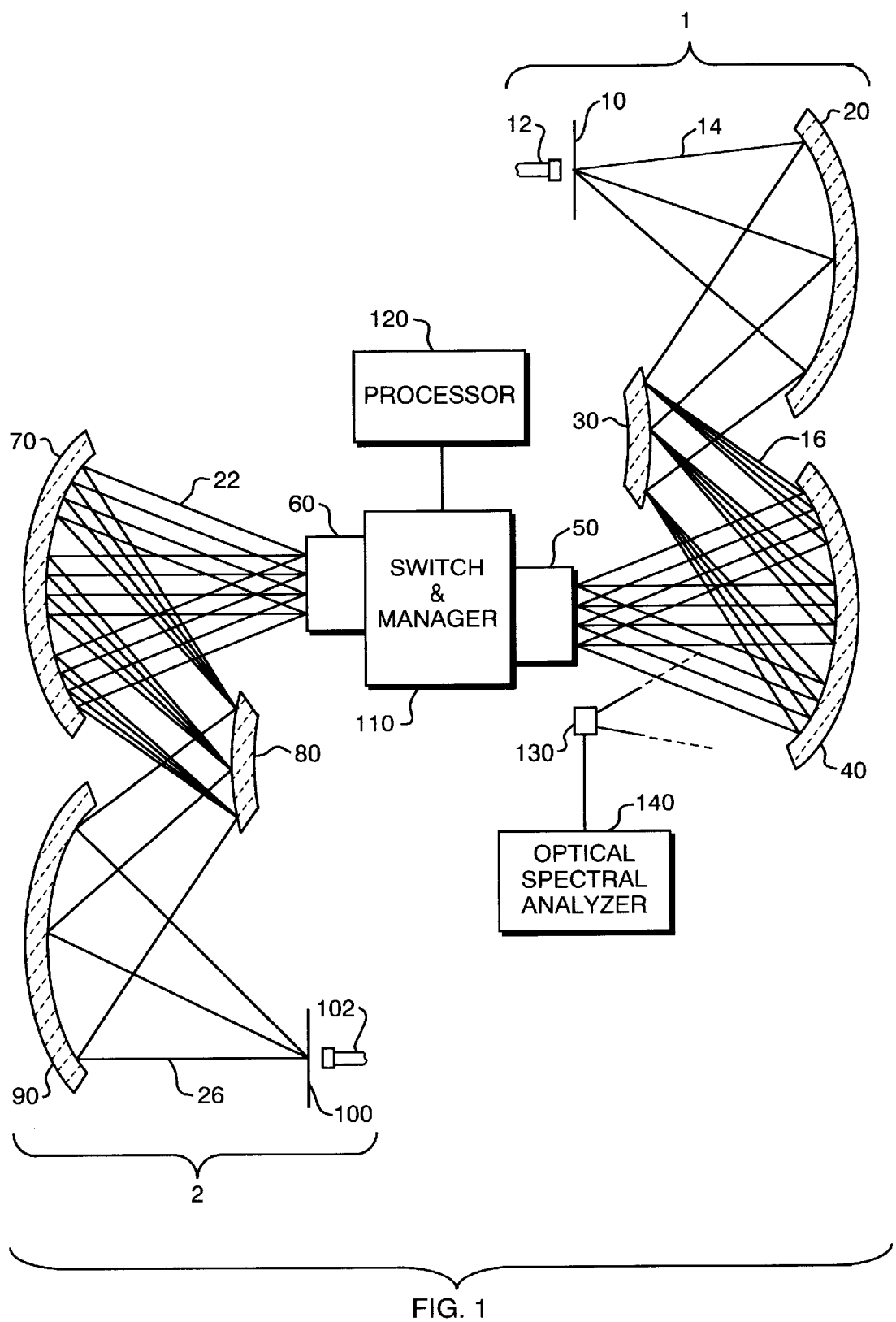
FIG. 1 illustrates an optical communication switching system according to an embodiment of the present invention.

Referring to FIG. 1, an optical communication channel switching system is shown for an embodiment of the invention. The system generally comprises first and second aberration corrected spectrometers 1 and 2 connected by a switch and manager 110 that is controlled by a processor 120. In the first spectrometer 1, light of an image 12 from a communication link, such as an optical fiber bundle, passes through a connector 10 onto a first concave mirror 20. The first mirror 20 is in a light path from the connector 10 and reflects light to a first aberration corrected convex diffraction grating 30. The first diffraction grating 30 receives the reflected light from the first mirror 20 and spectrally disperses the image received from the mirror 20 into a spectral image 16. A second concave mirror 40 receives the spectral image 16 from the first diffraction grating 30 and reflects the spectral image 16 to a detector 50.

Figure 2:
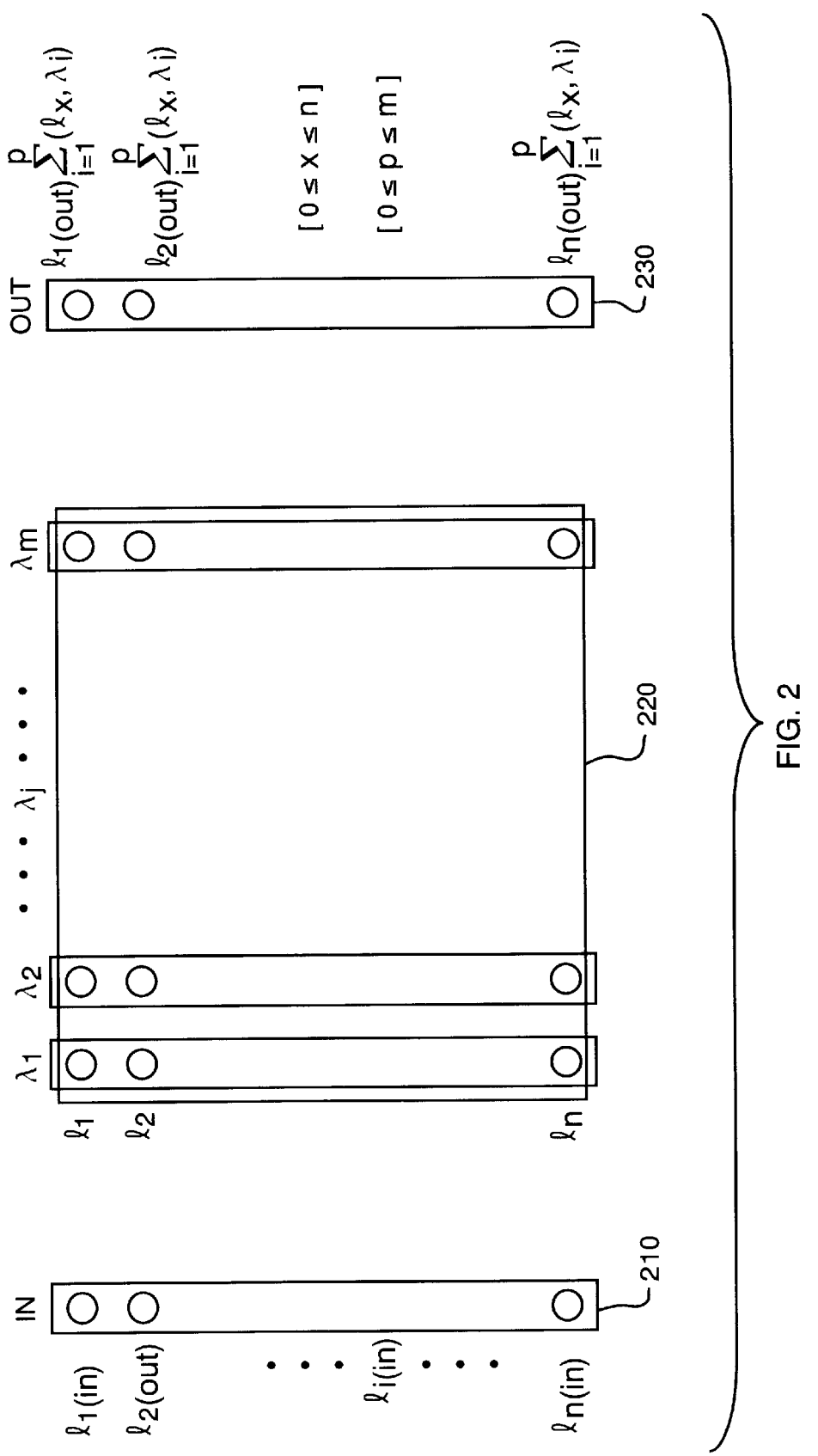
FIG. 2 illustrates an array of switching channels according to an embodiment of the present invention.

The spectrometer 1 receives multiple communication channels in a one dimensional array 210 where each site corresponds to a source $(l_1, l_2, \ldots l_n)$ as shown in FIG. 2. For instance, the sources $(l_1, l_2, \ldots l_n)$ may be vertical inputs of optical fibers. The spectrometer 1 generates a two dimensional array of channels 220 arranged according to frequency and source. For example, the columns of the array 220 may be arranged to have the same frequency and different sources and the rows may be arranged to have the same source and different frequencies. An example of this configuration is shown in FIG. 2 where the array 220 includes rows of sources $(l_1, l_2, \ldots l_n)$ and columns of frequencies $(\lambda_1, \lambda_2, \ldots \lambda)$. It is realized that this configuration can be arranged as desired. For instance, the rows may include frequencies and the columns may include sources.

Within this array 220, the switch and manager 110 may selectively switch to different array sites so that a one dimensional array 230 of frequency separated channels may be output from the second aberration corrected spectrometer 2. The switch and manager 110 may be a MEMS device, an LCD array, a bubble switch, or a waveguide. The selectable switching performed by the switch and manager 110 is controlled by a processor 120. For example, the processor 120 may control the switching of a channel position between sites within the array 220, between sites of the same frequency and different sources within the array 220, or between sites of different frequencies within the array 220.

A detector 60 detects the output of frequency separated channels from the switch and manager 110. Then, a third mirror 70 of the second spectrometer 2, which is aligned in the light path, receives a spectral image 22 of these reconfigured channels. The third mirror 70 reflects the spectral image 22 onto a second aberration corrected convex diffraction grating 80. A fourth concave mirror 90 is in the light path of the refracted light signal received from the second diffraction grating 80. The fourth mirror 80 reflects the light toward a connector 100 aligned in the light path. The light passes through the connector 100 and forms a one dimensional image array 102 that passes onto a communication link.

An embodiment of this system may also include a zero-order detector 130 and an optical spectral analyzer 140 as illustrated in FIG. 1. The zero-order detector 130 is aligned for receiving the zero-order signal of the image 12. This zero-order signal is then input to the spectral analyzer 140 for use as a monitor of the received image. The spectral analyzer 140 may include a television monitor for viewing each channel of the received image.

Figure 3:
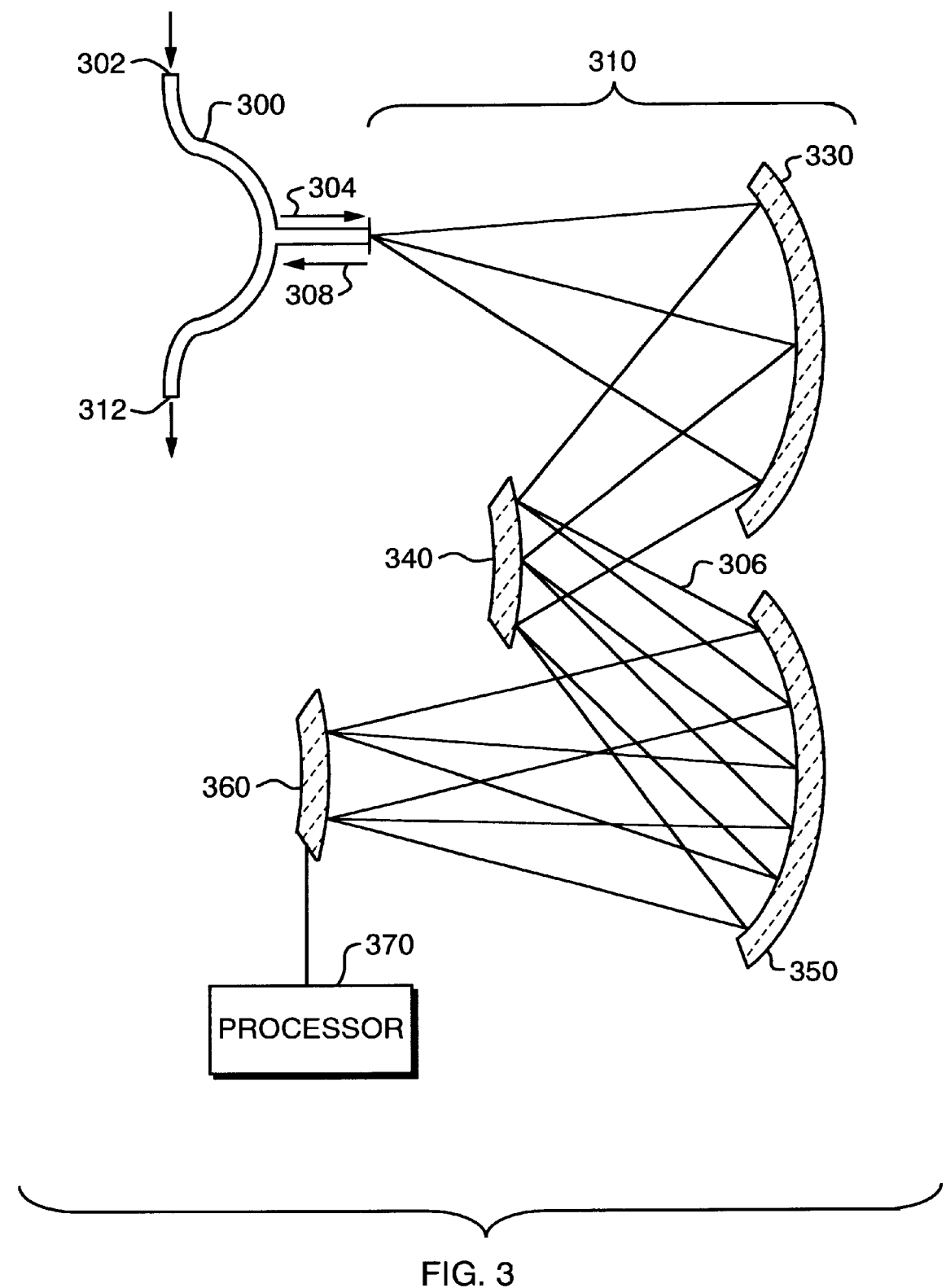
FIG. 3 illustrates an optical communication switching system utilizing a circulator according to another embodiment of the present invention.

Referring to FIG. 3, an optical communication switching system utilizing a circulator for selectively switching signals is shown according to another embodiment of the invention. A circulator 300 receives a signal 302 and a signal 304 is selectably input to an aberration corrected spectrometer 310. In this spectrometer 310, light passes through a communication link to a connector 320. A first concave mirror 330 receives the signal from the connector 320. The first mirror 330 is aligned in a light path with the connector 320 and an aberration corrected convex diffraction grating 340. The diffraction grating 340 receives the reflected light from the first mirror 330 and spectrally disperses the received signal into a spectral image 306. A second concave mirror 350 receives the spectral image 306 from the diffraction grating 340 and reflects the spectral image 306 to an array of reflectors 360.

The reflector array 360 reflects back all of the spectral image 306 toward the second mirror 350. The spectral image 306 is then reflected toward the diffraction grating 340. The diffraction grating 340 directs a refracted image toward the first mirror 330 so that the refracted image is received at the slit 320. A signal 308 is received by the circulator 300 and is output as signal 312.

The source may include a vertical input of optical fibers connected to multiple circulators so that a one dimensional array of sources is input to this switching system. A two dimensional array of channels arranged according to frequency and source will then be generated at the reflector arrays 360 from this input. The reflector arrays 360 may be MEMS devices designed such that desired frequencies are prevented from being reflected back. Also, the reflector arrays 360 may be connected to a processor 370 which selectively controls the frequencies that may be reflected back. Thereafter, a one dimensional array of reconfigured channels is output to the circulators.

Figure 4:
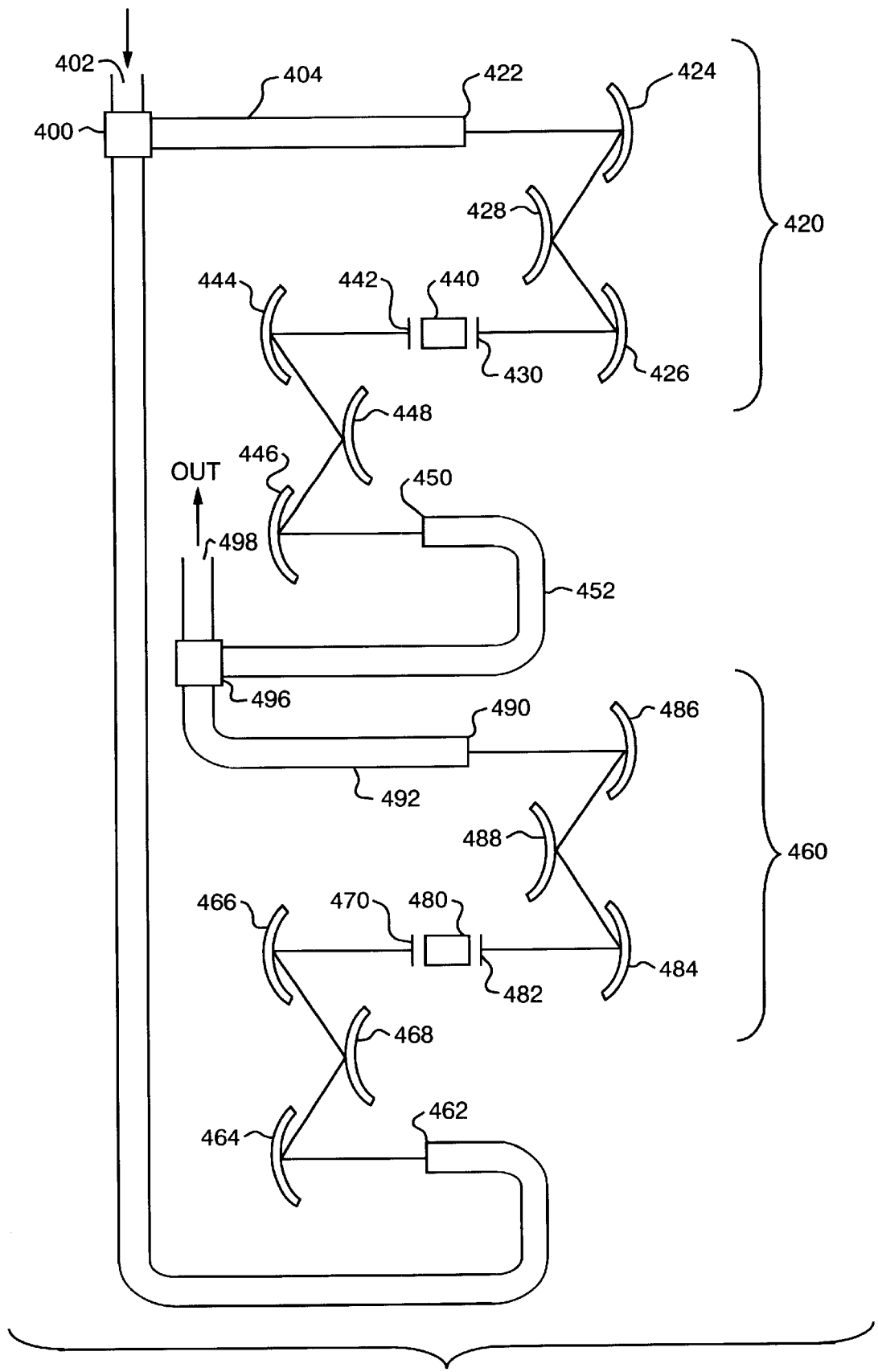
FIG. 4 illustrates a parallel stage optical communication switching system according to another embodiment of the present invention.

Referring to FIG. 4, a channel switch having parallel stages is shown. A signal 402 is transmitted over a communication link and is received by a multiplexor 400, which directs signals 404 and 406 toward first and second channel switch stages 420 and 460 respectively. The first and second channel switch stages 420 and 460 comprise similar elements and perform similar functions as in the switching systems described in the previous embodiments. The first channel switch stage 420 includes a connector 422 for receiving the signal 404 from a communication link. This signal 404 is received by a first concave mirror 424, and reflected towards a first aberration corrected convex diffraction grating 428. A spectral image is directed from the diffraction grating 428 toward a second concave mirror 426 which reflects this image toward a detector 430. A switch and manager 440 receives this signal and can selectively switch channels via a processor associated therewith.

The reconfigured channels from the switch and manager 440 are received by a detector 442, directed toward a third concave mirror 444, and reflected towards a second aberration corrected convex diffraction grating 448. The second diffraction grating 448 directs a refracted signal towards a fourth concave mirror 446 and reflects the signal towards a connector 450 for outputting a signal 452 over a communication link.

Similarly, the second channel switch stage 460 includes a connector 462 for receiving the signal 406 from the multiplexor 400 via the communication link. This signal 406 is received by a first concave mirror 464, and reflected towards a first aberration corrected convex diffraction grating 468. A spectral image is directed from the diffraction grating 468 toward a second concave mirror 466 which reflects this image toward a detector 470. A switch and manager 480 receives this signal and can selectively switch channels via a processor associated therewith.

The reconfigured channels from the switch and manager 480 are received by a detector 482, directed toward a third concave mirror 484, and reflected towards a second aberration corrected convex diffraction grating 488. The second diffraction grating 488 directs a refracted signal towards a fourth concave mirror 486 that reflects the signal towards a connector 490 for outputting a signal 492 over a communication link.

The first and second stages 420 and 460 are arranged to operate in parallel and provide redundancy. The output signals 452 and 492 are input to a switch 496. The switch 496 may select one of the signals for outputting therefrom as signal 498. Therefore, if one of the stages fails to operate, the system may switch over to the other stage to ensure that communication switching is provided. It will be appreciated that more than two parallel stages may be provided. The number of stages provided can then be selected based on the desired amount of redundancy for ensuring the communication switching.

Figure 5:
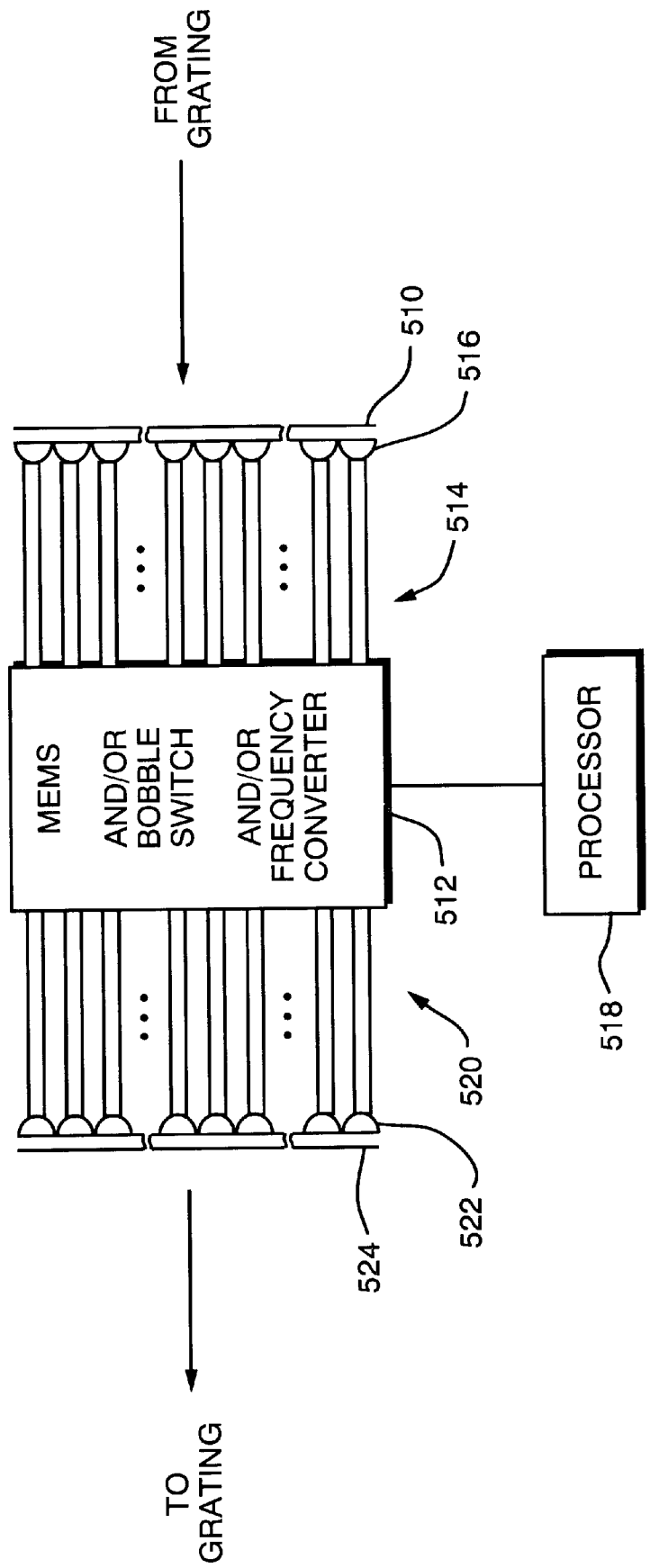
FIG. 5 illustrates a system for switching channels in a two dimensional array according to an embodiment of the present invention.

With respect now to FIG. 5 there is illustrated a system for switching the channels as they appear on a first two dimensional array 510, as illuminated by an aberration corrected spectrometer as shown above. The array 510 is a two dimensional (M X N) array as noted above and for the purpose of switching between sites in the array each site illumination is applied to a two dimensional (M X N) switching unit 512. The illumination from each site is applied to corresponding light pipes or optical fibers in a bundle 514 for transmission to the switching unit 512. Typically the light at each site is applied to the corresponding fiber in the bundle 514 by an array 516 of lenses that focus the light onto the core of the fiber.

The switching unit 512 diverts the light associated with each site to a different site as specified by a processor 518 and applies the thus switched light to fibers in an output bundle 520 through focusing lenses in an output array 522 to an array 524 (M X N) as before for use by the second aberration corrected spectrometer.

While other means may be used to transfer the light between the arrayed light 510 and the switching unit 512 and the output array of light 524, the apparatus described above allows for the remote location of the spectrometers and switching unit for ease of servicing or replacement.

The switching unit 512 is implementable in a variety of ways. Where switching involves only switching, including elimination, of channels of the same wavelength, a MEMS switch of micro machined silicon for example may be used under control of processor 518 to direct by way of mirrored surfaces of a set of MEMS arrays the light from one array location to another location at the same wavelength. The switched to channel must have been vacant, switched elsewhere itself or eliminated to avoid the presence of two channels in the same array location or site. A set of input and output bubble switches as it is known in the art may also be used for the same purpose. Where channels are to be switched between wavelengths a frequency converter or modulator is used in conjunction with MEMS or bubble switches as mention above to, at some point in the switching, change the wavelength to one appropriate to the array location where the channel is to be switched.

Figure 6:
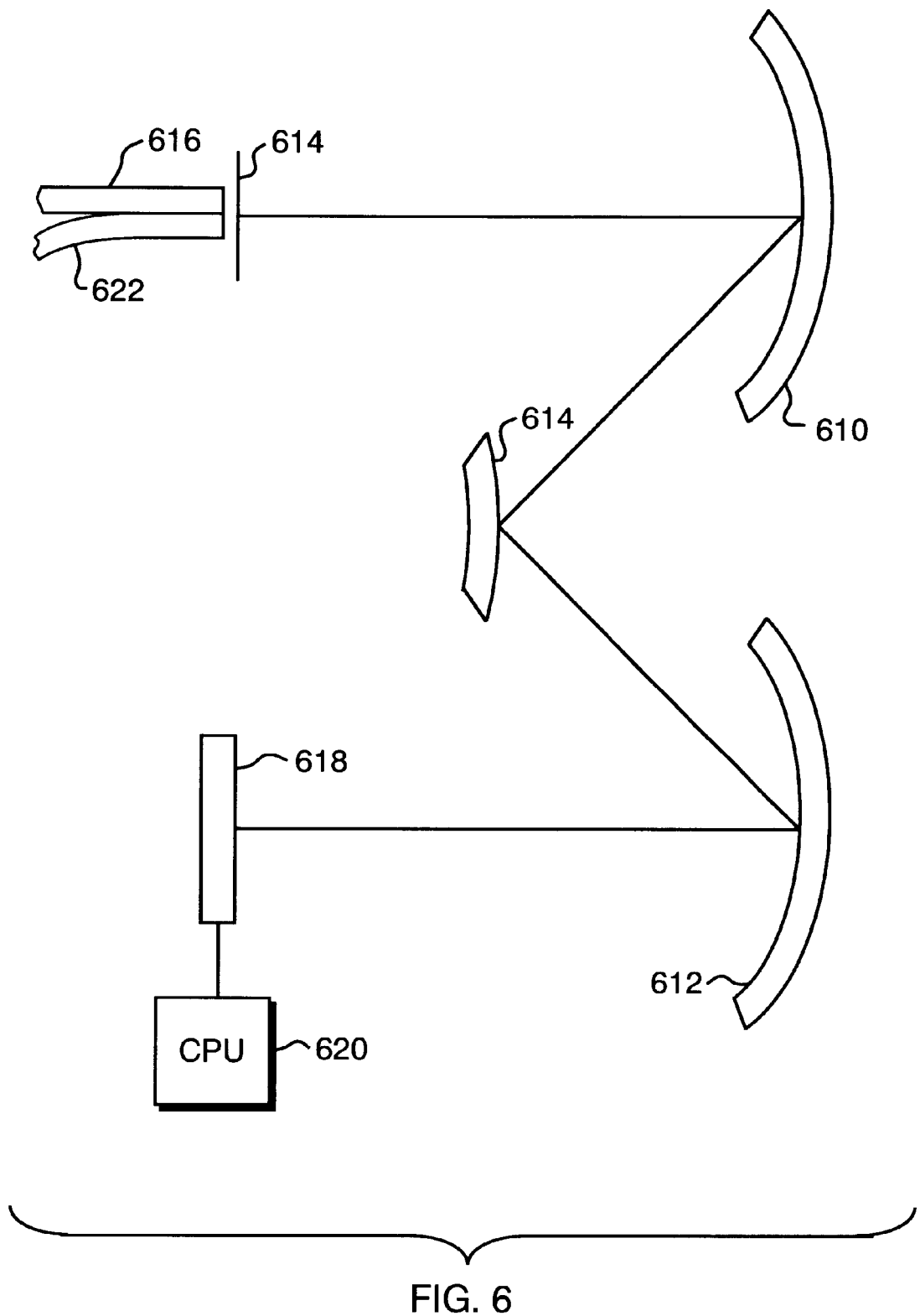
FIG. 6 illustrates a single spectrometer system for another embodiment of the present invention.
Figure 7:
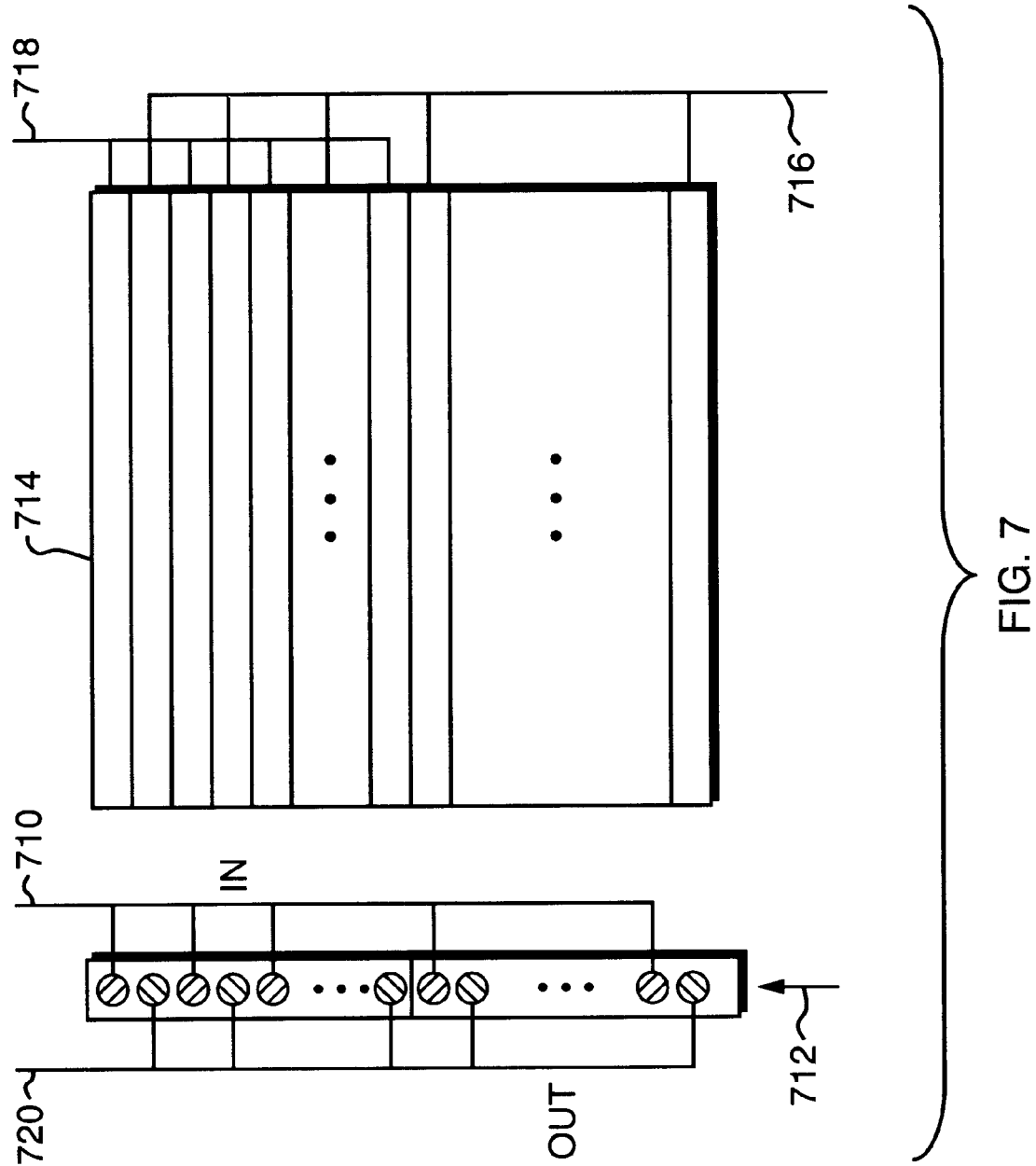
FIG. 7 illustrates a two dimensional array of channels generated by the single spectrometer system illustrated in FIG. 6.
Figure 8:
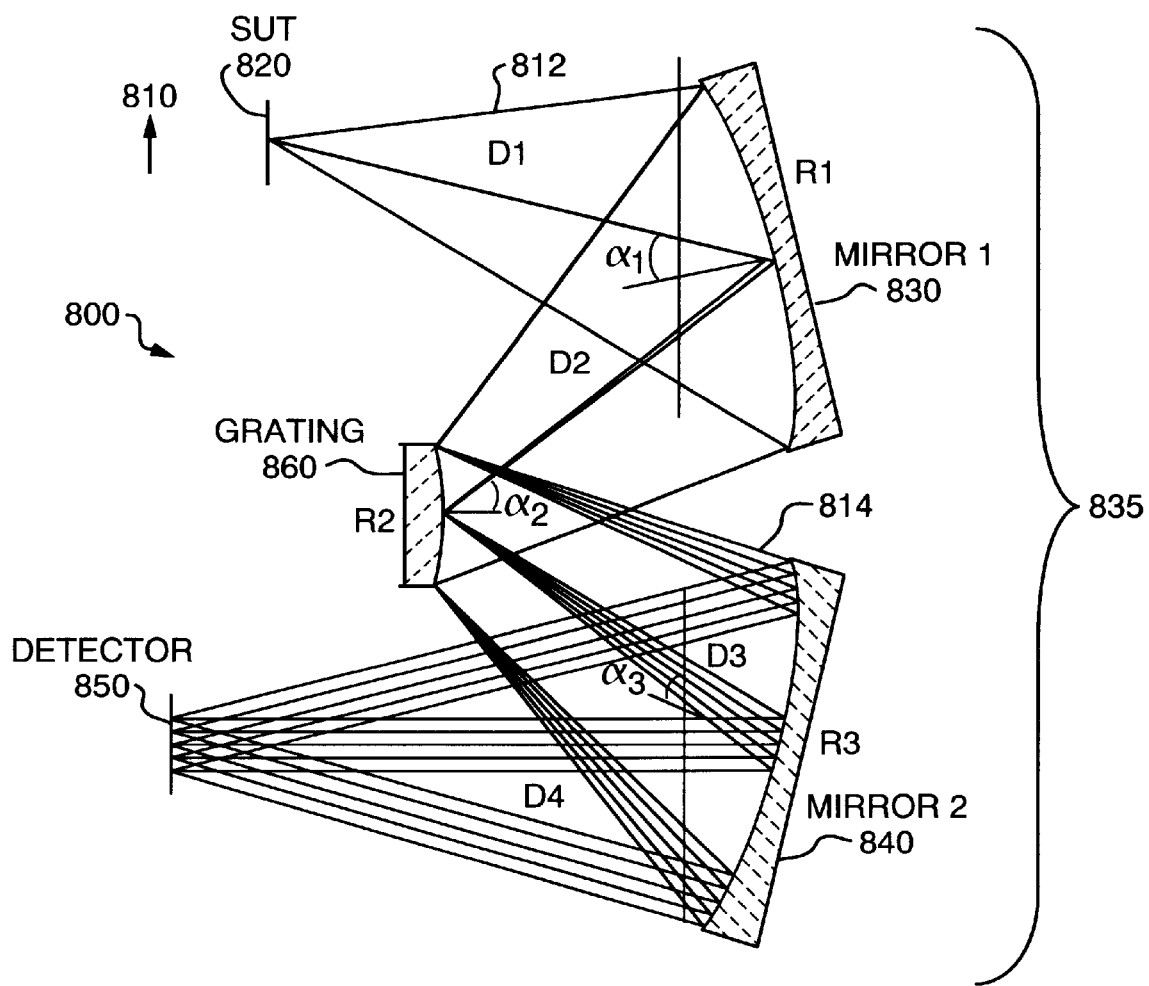
FIG. 8 illustrates a known spectrometer.

In another embodiment of the invention as illustrated in FIGS. 6 and 7, a single spectrometer is used to provide the function of two, albeit with only half of the number of channels that could otherwise be handled. As shown in FIG. 6 a single spectrometer of grating 614 and mirrors 610 and 612 as described above receives at a single dimension input array 614 the light from a bundle 616 of fibers. The light from these is spectrally spread into a two dimensional array 618 of reflectors which are switchable between a reflect and deflect or absorb state controlled by a processor 620 to determine which channels are returned through the spectrometer to the input array 614 for application to the output fibers in a bundle 622.

The number of fibers and thus channels is one half the number the system could handle with two spectrometers because the fibers are interleaved between input fibers 710, shown in FIG. 7, in the bundle 616 and output fibers 720 in the bundle 622. The channel switch array 618 is shown in array 714 to have the input spectra 718 and output spectra alternating as well. The switch array 618 includes a mirror system or the equivalent to transport or block the light from one input spectra 718 to individual channels in the corresponding output spectra 716 using, MEMS devices, bubble switches and mirrors, or any other light control elements. Alternatively, the geometry of the spectrometer of FIG. 6 can be structured so that the input and output bundles 710, 720 could be entirely separated at opposite ends of the input array 614 and the array 714 be a direct reflection back of the incoming light, or not as the CPU 620 designates.

Having described various embodiments of the invention, it will be apparent to those skilled in the art that other embodiments incorporating these concepts may be used. Accordingly, it is submitted that the invention should not be limited to the described embodiments but rather should be limited only by the spirit and scope of the appended claims.

What is claimed is:

1. An optical communication channel switch comprising:
    an aberration corrected spectrometer adapted for receiving plural channels of communication in a one dimensional array of sites, each corresponding to a source and to provide said channels in a two dimensional array in which said channels of similar frequency and different source are distributed to corresponding ones of columns or rows and channels of differing frequency and common source are distributed to corresponding others of said columns or rows;
    a channel selector for selectively switching channels among sites in said array to provide an array recombinable into a single dimension array of frequency separated channels in each array site.

2. The channel switch of claim 1 further including a second aberration corrected spectrometer adapted to receive channels from said two dimensional array as selectively switched by said channel selector and combine them into a single dimensional array of sites one or more of which have a plurality of frequency separated channels.

3. The channel switch of claim 1 further including a reflector operative with said selector to return said channels, as selectively switched or eliminated, to said one dimensional array.

4. The channel switch of claim 1 wherein said channel selector comprises a MEMS device for selectively transmitting from said two dimensional array to a further two dimensional array and a controller for said MEMS device is provided to control said selective transmitting by said channel selector.

5. The channel switch of claim 1 wherein said channel selector provides switching of a channel position between sites within said two dimensional array.

6. The channel switch of claim 5 wherein said channel selector provides said switching between sites of the same frequency and different corresponding sources.

7. The channel switch of claim 5 wherein said channel selector provides switching between sites of different corresponding frequencies.

8. The channel switch of claim 7 wherein said channel selector further includes a frequency converter.

9. The channel switch of claim 1 wherein said channel selector includes a bubble switch for switching channels between sites in said two dimensional array.

10. The channel switch of claim 1, further comprising at least one redundant channel switch arranged to provide parallel operation with said aberration corrected spectrometer and said channel selector, each said redundant channel switch including a redundant aberration corrected spectrometer and a redundant channel selector for receiving the plural channels and generating the single dimension array of frequency separated channels, said redundant channel switch providing redundancy whereby if the channel switch fails to operate, said redundant channel switch provides communication switching.

11. The channel switch of claim 1 further including a circulator in a communication path with each said source.

12. In an optical communication system having a plurality of communication input and output communication channel carriers each carrying plural frequency separated channels, apparatus for separately distributing said channels into a two dimensional array comprising:
    an aberration corrected spectrometer adapted for receiving plural channels of communication in a one dimensional array of sites, each corresponding to a carrier source and to provide said channels in a two dimensional array in which said channels of similar frequency and different source are distributed to corresponding ones of columns or rows and channels of differing frequency and common source are distributed to corresponding others of said columns or rows.

13. The apparatus of claim 12 further including a controlled reflector operative to return said channels, as selectively switched or eliminate, to said one dimensional array.

14. The apparatus of claim 12 further including a MEMS device for selectively transmitting from said two dimensional array to a further two dimensional array and a controller for said MEMS device to control said selective transmission.

15. The apparatus of claim 12 wherein said communication system includes a channel selector to provide switching of a channel position between sites within said two dimensional array.

16. The apparatus of claim 15 wherein said channel selector provides said switching between sites of the same frequency and different corresponding sources.

17. The apparatus of claim 15 wherein said channel selector provides switching between sites of different corresponding frequencies.

18. The apparatus of claim 17 wherein said channel selector further includes a frequency converter.

19. The apparatus of claim 12 wherein said channel selector includes a bubble switch for switching channels between sites in said two dimensional array.

20. The apparatus of claim 15, further comprising at least one redundant channel switch arranged to provide parallel operation with said aberration corrected spectrometer and said channel selector, each said redundant channel switch including a redundant aberration corrected spectrometer and a redundant channel selector for receiving the plural channels and generating the single dimension array of frequency separated channels, said redundant channel switch providing redundancy whereby if the channel switch fails to operate, said redundant channel switch provides communication switching.

21. The apparatus of claim 12 further including a circulator in a communication path with each said source.

* * * * *